United States Patent [19]
Kelly

[11] Patent Number: 6,103,168
[45] Date of Patent: Aug. 15, 2000

[54] METHOD FOR MANUFACTURING AN INTEGRALLY MOLDED APPLIQUE ARTICLE FOR A VEHICLE WITH INTEGRAL COSMETIC AND FUNCTIONAL MATERIAL

[75] Inventor: Walter J. Kelly, Marion, Ind.

[73] Assignee: GenCorp Inc.

[21] Appl. No.: 08/789,504

[22] Filed: Jan. 27, 1997

Related U.S. Application Data

[63] Continuation of application No. 08/408,223, Mar. 22, 1995, abandoned.

[51] Int. Cl.[7] .............................. B29C 70/68; B32B 31/04
[52] U.S. Cl. ......................... 264/259; 156/245; 264/260; 264/261; 264/271.1
[58] Field of Search ..................... 49/440, 441; 52/716.5, 52/716.6; 296/201, 202, 901; 428/31, 99; 156/242, 245; 264/259, 260, 261, 263, 271.1, 275, 277, 279

[56] References Cited

U.S. PATENT DOCUMENTS

| | | |
|---|---|---|
| 4,736,981 | 4/1988 | Barton et al. . |
| 4,833,847 | 5/1989 | Inayama et al. . |
| 4,916,008 | 4/1990 | Katayama et al. . |
| 4,974,901 | 12/1990 | Katayama . |
| 5,028,460 | 7/1991 | Kimura et al. . |
| 5,033,246 | 7/1991 | Vaughan et al. . |
| 5,092,078 | 3/1992 | Keys . |
| 5,171,499 | 12/1992 | Cehelnik et al. . |
| 5,226,998 | 7/1993 | Few . |
| 5,475,947 | 12/1995 | Dupay ................................ 49/440 X |
| 5,743,047 | 4/1998 | Bonne et al. ........................ 49/441 X |

*Primary Examiner*—Adrienne C. Johnstone
*Attorney, Agent, or Firm*—Brinks Hofer Gilson & Lione

[57] ABSTRACT

An applique article for a "B" pillar or other external surface of a vehicle is composed of integrally bonded cosmetic and functional materials. The applique article includes a thermoplastic base portion, an elastomer or thermoplastic elastomer functional sealing lip portion and a decorative covering portion applied to an exposed surface of the article. At least the functional sealing lip portion and the base portion are integrally bonded together in a mold during a process of manufacturing the article.

3 Claims, 2 Drawing Sheets

METHOD FOR MANUFACTURING AN INTEGRALLY MOLDED APPLIQUE ARTICLE FOR A VEHICLE WITH INTEGRAL COSMETIC AND FUNCTIONAL MATERIAL

This application is a continuation of application Ser. No. 08/408,223, filed Mar. 22, 1995 now abandoned.

BACKGROUND OF THE INVENTION

1. Field of the Invention

The present invention relates generally to an applique article for vehicles; and, more particularly, to an applique article for the "B" pillar or other surface of a vehicle which is composed of integrally bonded cosmetic and functional materials.

2. Description of the Prior Art

Appliques are decorative members which are fastened to a vehicle surface to add styling and to functionally cover unsightly portions of the vehicle. For example, it has become conventional practice to provide appliques on the external surfaces of "B" pillars of a vehicle. A pillar is a structural member provided to support the structure of a vehicle. In an automobile, the forward pillar is conventionally designated as the "A" pillar, the center pillar as the "B" pillar and the rear pillar as the "C" pillar. The "B" pillar is normally provided between the front and rear side windows of the vehicle.

Because of the high visibility of the "B" pillar area, appliques are commonly used to provide an aesthetically pleasing surface on the pillar. Such an applique is used, for example, to cover manufacturing imperfections or the like and is commonly finished in cooperating or matching vehicle colors to provide a desirable aesthetic appearance.

Current applique articles for the "B" pillars of automobiles typically include various sealing members such as rubber seals, a glassrun channel and a cut-line seal that are mechanically fastened to the "B" pillar applique. The applique itself is usually a metal-coated trim or a plastic trim that is mechanically attached to the metal base forming the pillar.

A disadvantage of such prior constructions is that the applique article employs multiple components and requires plural steps to assemble the full applique and sealing members which increases assembly time and manufacturing costs. In addition, overall costs are further increased by the necessity of maintaining an inventory of the component parts.

SUMMARY OF THE INVENTION

The present invention provides an applique article for a "B" pillar or other surface of an automobile or other vehicle that is composed of integrally bonded materials that meet the requirements of "B" pillar appliques with respect to both function and appearance; and to a method for manufacturing an applique article that can be finished out of a mold, thus eliminating extra assembly steps and the need to maintain a component part inventory as is typically required in the prior art.

An integrally molded applique article according to the present invention comprises a thermoplastic base portion and an elastomer or thermoplastic elastomer functional sealing lip portion, wherein the base portion and the functional sealing lip portion are bonded together in a mold during a process of manufacturing the article.

According to preferred embodiments of the invention, the base portion, the functional sealing lip portion and a decorative covering portion are integrally bonded in a mold during a process of manufacturing the article to provide a finished applique article out of the mold that can be directly affixed to a vehicle. Alternatively, the decorative covering portion can be applied in a post-molding step to provide the finished applique article.

According to the present invention, the decorative covering portion may be a film, painted or integrally colored, or laminated thermoplastic that will bond to the functional sealing lip portion and/or to the thermoplastic base portion during the molding process. Alternatively, the covering portion can comprise an appropriate in-mold coating applied to a surface of the article during the molding process, or a painted-on or otherwise applied coating or film applied in a post-molding step. The functional sealing lip portion preferably comprises an elastomer or a thermoplastic elastomer that is bondable to the decorative covering portion and/or to the thermoplastic base portion, and that has sufficient flexibility to provide an effective sealing function. The thermoplastic base portion comprises a relatively rigid bar-shaped member which is bondable to the functional sealing lip portion and/or to the decorative film portion.

Exemplary of materials usable for the decorative film covering portion include REXHAM polyvinylidene difluoride and DORRIE polyvinyl fluoride. The functional sealing lip portion can, for example, be composed of SANTOPRENE SUNPRENE or ALCRYN thermoplastic elastomers, or EPDM or SBR thermoset rubbers. The thermoplastic base portion can be formed of polypropylene, thermoplastic olefin, polyurethane, styrenic and other suitable materials.

According to a further aspect, the present invention comprises a method for manufacturing an integrally molded applique article for a vehicle which comprises the steps of bonding at least a thermoplastic base portion and a functional sealing lip portion together in a mold during a molding process, and applying a decorative covering portion to provide a finished applique article. The decorative covering portion can be applied either in the mold during the molding process or externally of the mold in a post-molding step.

According to one presently preferred embodiment of the invention, the thermoplastic base portion or the functional sealing lip portion is molded as a separate component and used as an insert in a mold which has a decorative film covering portion placed in its designated area. The material for the other portion is then injected into the mold to bond the three portions together to provide a finished product out of the mold.

As an alternative embodiment, the covering portion can comprise an in-mold coating applied during the molding process or a painted or coated-on covering or a post-applied film applied to the article in a post-molding step.

Yet further, the applique article of the invention can be molded by either a sequential or a co-injection process which eliminates the need for separate insert molding.

Further advantages and specific features of the present invention will become apparent hereinafter in conjunction with the following detailed description of a presently preferred embodiment.

DETAILED DESCRIPTION OF THE PREFERRED EMBODIMENTS

Figure 1:
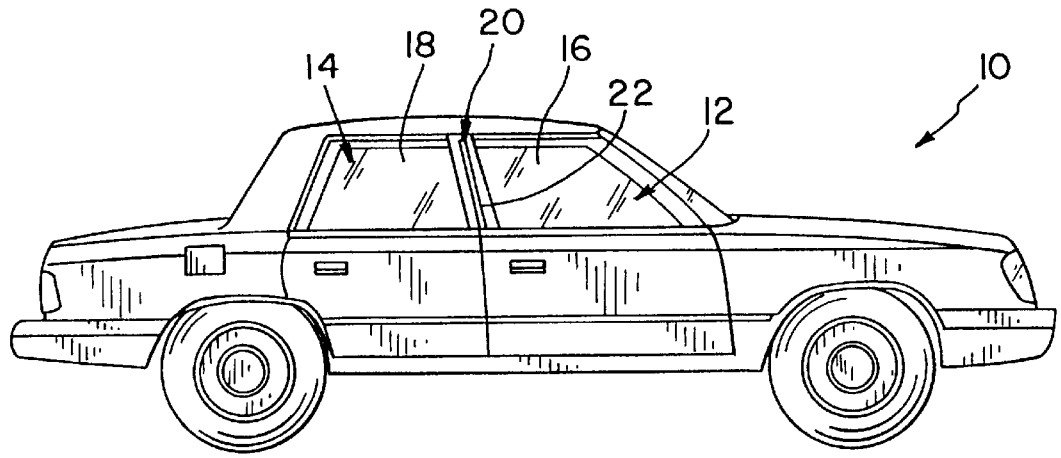
FIG. 1 is a schematic side view of a vehicle illustrating a "B" pillar applique article thereon.

FIG. 1 schematically illustrates a side view of an automobile 10 of the four-door type including front and rear door assemblies 12 and 14 having front and rear windows 16 and 18, respectively. The vehicle includes a "B" pillar, generally designated by reference number 20, which is located between the front and rear door assemblies, and, in particular, which separates the front window 16 from the rear door assembly 14 of the vehicle.

Reference No. 22 schematically illustrates a "B" pillar applique article according to a presently preferred embodiment of the invention and which is shown as being attached to the exposed, outer surface of the "B" pillar 20.

Although FIG. 1 illustrates a four-door automobile, "B" pillars are also utilized in two-door automobiles as well as in other vehicles.

Figure 2:
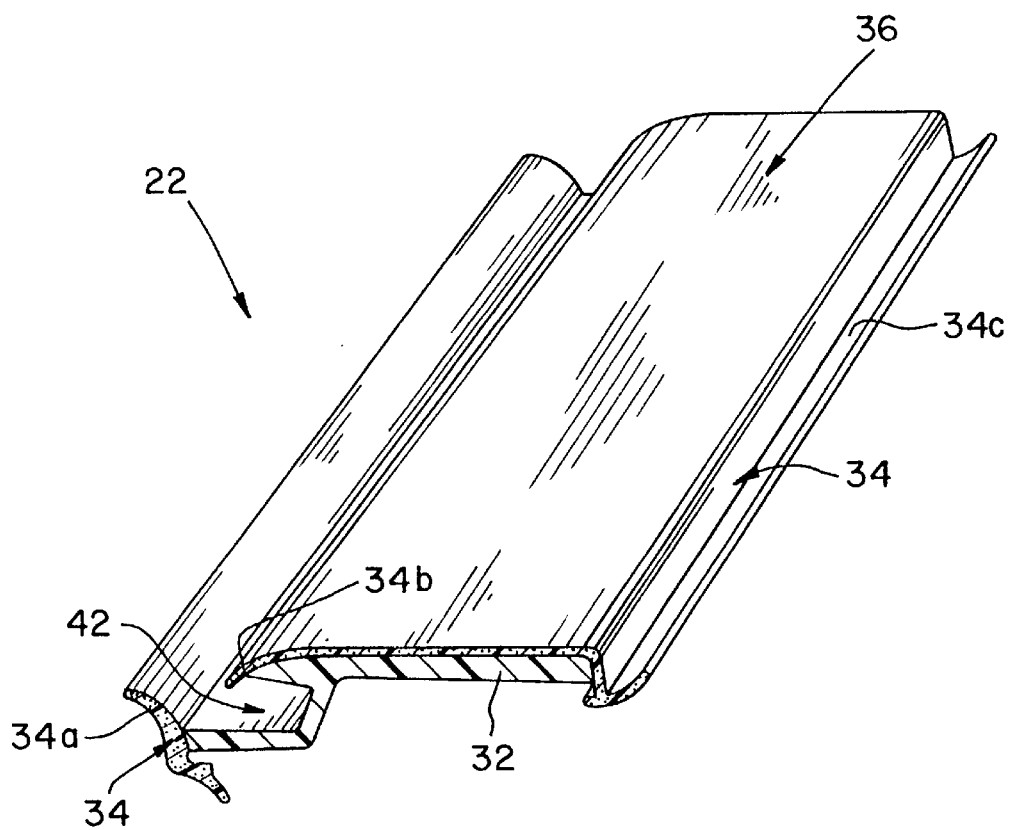
FIG. 2 is a schematic perspective view illustrating a "B" pillar applique article according to a presently preferred embodiment of the invention.
Figure 3:
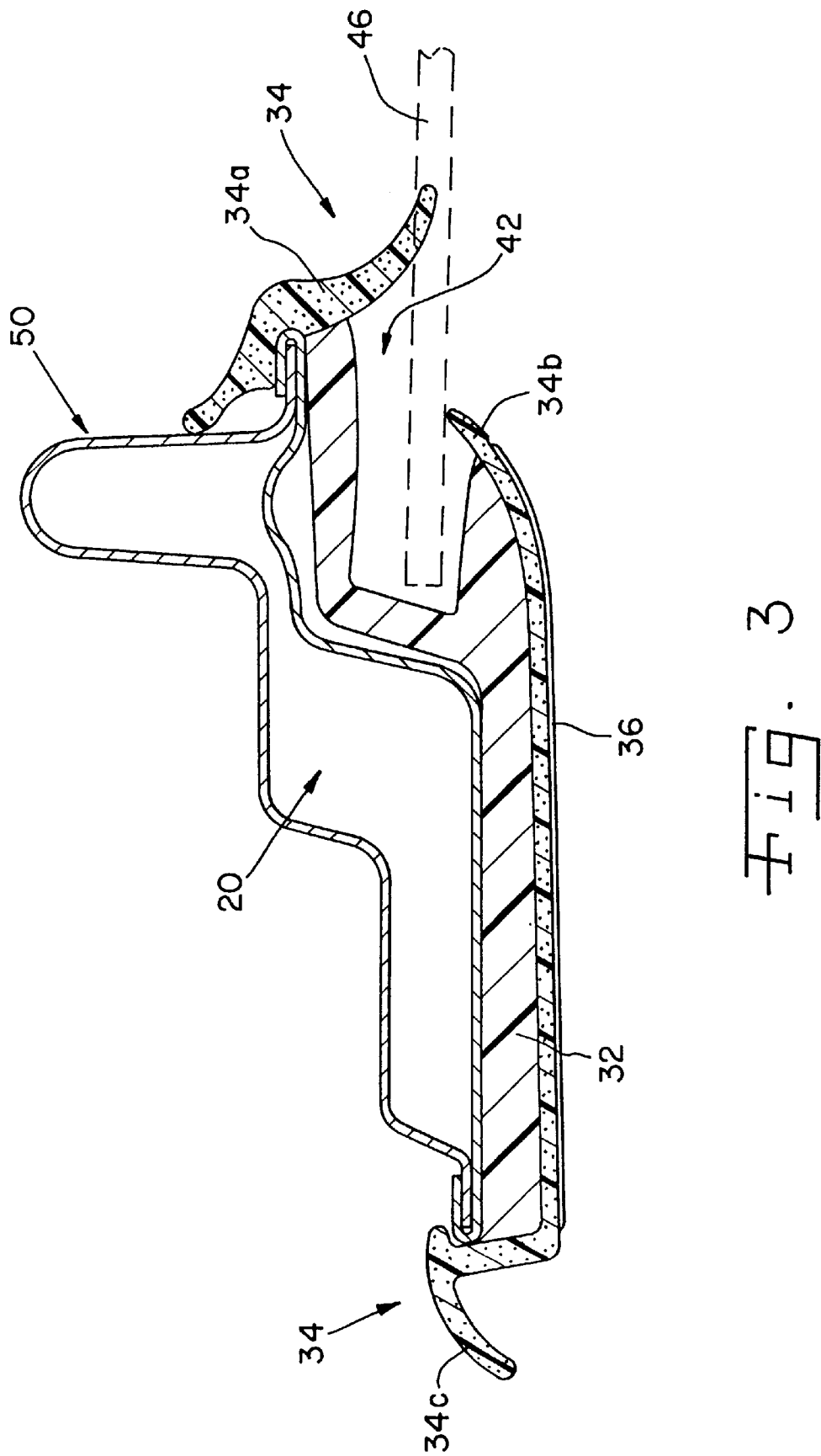
FIG. 3 is a schematic cross-sectional view of the "B" pillar applique of FIG. 2.

FIGS. 2 and 3 illustrate the "B" pillar applique article 22 in greater detail. As shown in FIGS. 2 and 3, the applique article generally comprises a base portion 32, a functional sealing lip portion 34 and a decorative covering portion 36.

The base portion 32 is composed of a thermoplastic material possessing substantial rigidity, and can be formed of various materials including polypropylene, thermoplastic olefin, polyurethane and styrenic. The base portion is generally in the shape of a bar and may have a thickness of, for example, about one-quarter of an inch. The length, width and precise cross-sectional shape of the base portion will, of course, vary significantly depending on the design of the particular vehicle on which it is to be used and on other requirements of the user; and it should be understood that the illustrated configuration is intended to be exemplary only.

The functional sealing lip portion 34 comprises an elastomer or a thermoplastic elastomer having sufficient flexibility to provide an effective sealing function. In the illustrated embodiment, the functional sealing lip portion 34 includes portions 34a and 34b defining a glassrun channel 42 and a sealing portion 34c for sealing against the rear door of the vehicle. FIG. 3 illustrates the front window 46 of a vehicle in dotted line to illustrate how it is received within the glassrun channel 42.

Exemplary of suitable functional sealing lip materials which may be utilized include SANTOPRENE, SUNPRENE or ALCRYN thermoplastic elastomers, or EPDM or SBR thermoset rubbers.

The decorative covering portion 36 may be a film which is painted or integrally colored throughout, or laminated thermoplastic; or a painted-on or otherwise applied coating. The function of the decorative covering portion is to provide an aesthetically pleasing appearance to the exterior surface of the applique article; and, in addition, to provide a protective surface to protect the applique article against deterioration. Examples of suitable decorative film materials which may be utilized include Rexham and Dorrie.

An important feature of the present invention is that the base portion, the functional sealing lip portion and the decorative covering portion be composed of compatible materials which are capable of being bonded together as needed to provide an applique article that can be attached to the "B" pillar or other surface of the vehicle as a finished component. Depending on the particular design of the article and on the particular process for manufacturing the article, for example, each of the base, functional sealing lip and decorative covering portions may be bonded to one or both of the other portions.

In general also, the areas of attachment of the various portions will vary depending on needed functional requirements. In some embodiments, for example, the functional sealing lip portion may totally encapsulate the thermoplastic base portion in the glassrun channel, or the functional sealing lip portion may not interface between the decorative covering portion and the thermoplastic base portion as is shown in FIG. 3.

As indicated above, an important feature of the "B" pillar applique article of the present invention is that it comprises a completed unit that can be directly affixed to the frame 50 of the "B" pillar 20 of the vehicle, as is schematically illustrated in FIG. 3. The article can be formed as a complete unit out of the mold, or the base portion and the functional sealing lip portions can be bonded together in a mold and the protective covering portion can be applied out of the mold in a post-molding step. The applique article can be affixed to the "B" pillar or other external vehicle surface in a conventional manner, for example, by a weld stud or clip, by an adhesive, or by another suitable means.

The "B" pillar applique article according to the present invention is especially suited for a molding process; and, in particular, for an injection molding process. According to one presently preferred embodiment, the "B" pillar applique article can be efficiently manufactured utilizing the following process methodology.

Initially, the thermoplastic base portion is molded as a separate component and then used as an insert in a mold which has a decorative film covering portion properly placed in a designated area in the mold. Functional sealing lip material is then injected into the mold to form a bond between both interfaces; and, following the molding process, the finished applique article is removed from the mold.

In accordance with the present invention, samples were prepared using the above-described process methodology. Sample No. 1 was composed of a thermoplastic olefin base material, SANTOPRENE TPE functional sealing lip material and black REXHAM film with polypropylene backing for the decorative covering material. Sample No. 2 was formed utilizing glass-filled polypropylene as the thermoplastic base material, SANTOPRENE TPE as the functional sealing lip material and blue REXHAM film with polypropylene backing as the decorative covering material. Both samples provided a finished applique article out of the mold which could be directly attached to a vehicle.

In addition to the process methodology described above, various alternative processes can be utilized to manufacture a finished applique article out of the mold according to the present invention. For example, the functional sealing lip portion can first be molded or extruded as a separate component and then used as an insert in a mold which has a decorative film covering portion properly placed in the mold. The thermoplastic base material is then injected into the mold and bonded to both the functional sealing lip portion and the decorative film covering portion.

In yet a further alternative process, the functional sealing lip portion can be molded or extruded as a separate component and placed in a mold together with an in-mold coating covering portion on the surface thereof. The thermoplastic base portion can then be molded in the mold bonding to both the functional sealing lip portion and the coating.

In still a further alternative embodiment of the invention, the functional sealing lip portion can be molded or extruded, placed in a mold, and the thermoplastic base is then molded, bonding to the functional sealing lip portion. The article is then removed from the mold and a decorative covering portion in the form of a film or a painted-on or otherwise applied coating is applied in a post-molding step to complete the applique article.

In addition to the processes described above, yet other processes can be utilized to manufacture the applique article of the present invention. For example, applique articles according to the present invention can also be manufactured utilizing a sequential or co-injection process, if desired. Such processes will eliminate the need for a separate insert as in the above-described processes.

Although the present invention has been described primarily as an applique article for the "B" pillar of a vehicle, it should be understood that the invention is not so limited. The invention could also be applied to other pillars or other external surfaces of a vehicle, for example.

While what has been described comprises presently preferred embodiments, it should be recognized that the invention can take numerous other forms. Accordingly, it should be understood that the invention should be limited only insofar as is required by the scope of the following claims.

What is claimed is:

1. A method for manufacturing an integrally molded applique article for a vehicle, said applique article including a substantially rigid thermoplastic base portion and a functional sealing lip portion, said method comprising the steps of:

positioning one of said thermoplastic base portion and said functional sealing lip portion in a mold;

bonding said positioned portion to the other of said thermoplastic base portion and said functional sealing lip portion in said mold during the formation of said other portion; and applying a decorative covering portion to one of the thermoplastic base portion and the functional sealing lip portion to form said applique article.

2. The method of claim 1 wherein said decorative covering portion is applied by bonding said base portion, said functional sealing lip portion, and said decorative covering portion together in said mold during said formation of said applique article.

3. The method of claim 2 wherein said decorative covering portion comprises a thermoplastic film.

* * * * *